United States Patent
Lin

(10) Patent No.: US 9,423,240 B2
(45) Date of Patent: Aug. 23, 2016

(54) LASER PROCESSING SYSTEM AND METHOD OF SAME

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 179 days.

(21) Appl. No.: 14/301,342

(22) Filed: Jun. 11, 2014

(65) Prior Publication Data

US 2014/0368348 A1    Dec. 18, 2014

(30) Foreign Application Priority Data

Jun. 14, 2013   (TW) .................................. 102121193

(51) Int. Cl.
G08B 5/00  (2006.01)
G01B 11/06  (2006.01)
G01B 11/02  (2006.01)

(52) U.S. Cl.
CPC ......... *G01B 11/0608* (2013.01); *G01B 11/026* (2013.01)

(58) Field of Classification Search
CPC .......................... G01B 11/0608; G01B 11/026
USPC ...................................................... 340/815.4
See application file for complete search history.

(56) References Cited

U.S. PATENT DOCUMENTS

| | | | | |
|---|---|---|---|---|
| 4,437,332 A | * | 3/1984 | Pittaro | G01B 17/02 73/1.82 |
| 5,463,202 A | * | 10/1995 | Kurosawa | B23K 26/032 219/121.62 |
| 5,489,888 A | * | 2/1996 | Jagiella | G01D 3/08 324/611 |
| 2008/0204748 A1 | * | 8/2008 | Nomaru | B23K 26/04 356/332 |
| 2010/0089886 A1 | * | 4/2010 | Sercel | B23K 26/16 219/121.72 |
| 2014/0056507 A1 | * | 2/2014 | Doyle | G01B 11/002 382/152 |

* cited by examiner

*Primary Examiner* — Kerri McNally
(74) *Attorney, Agent, or Firm* — ScienBiziP, P.C.

(57) ABSTRACT

A laser processing system for accurate detection of how far away the surface of a workpiece may be includes a platform, a laser processing device, a distance detection device, and a driving device. The platform is configured for carrying at least one workpiece. Both the laser processing device and the distance detection device are arranged upon the platform. The distance detection device detects an actual distance between a surface of the workpiece and the laser processing device, and compares the preset height with the actual height. If the preset height is less than the actual height, the distance detection device emitting a warning signal to remind a worker to re-enter a new preset height.

10 Claims, 5 Drawing Sheets

LASER PROCESSING SYSTEM AND METHOD OF SAME

FIELD

The present disclosure relates to a laser processing system and a method of same.

BACKGROUND

A laser processing device is usually used in a laser process, such as laser cutting, laser engraving and die-microstructure processing. In order to obtain a better processing efficiency, the laser beam emitted by the laser process device must focus on a surface of a pre-processed workpiece even though different workpieces have different thicknesses and heights.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
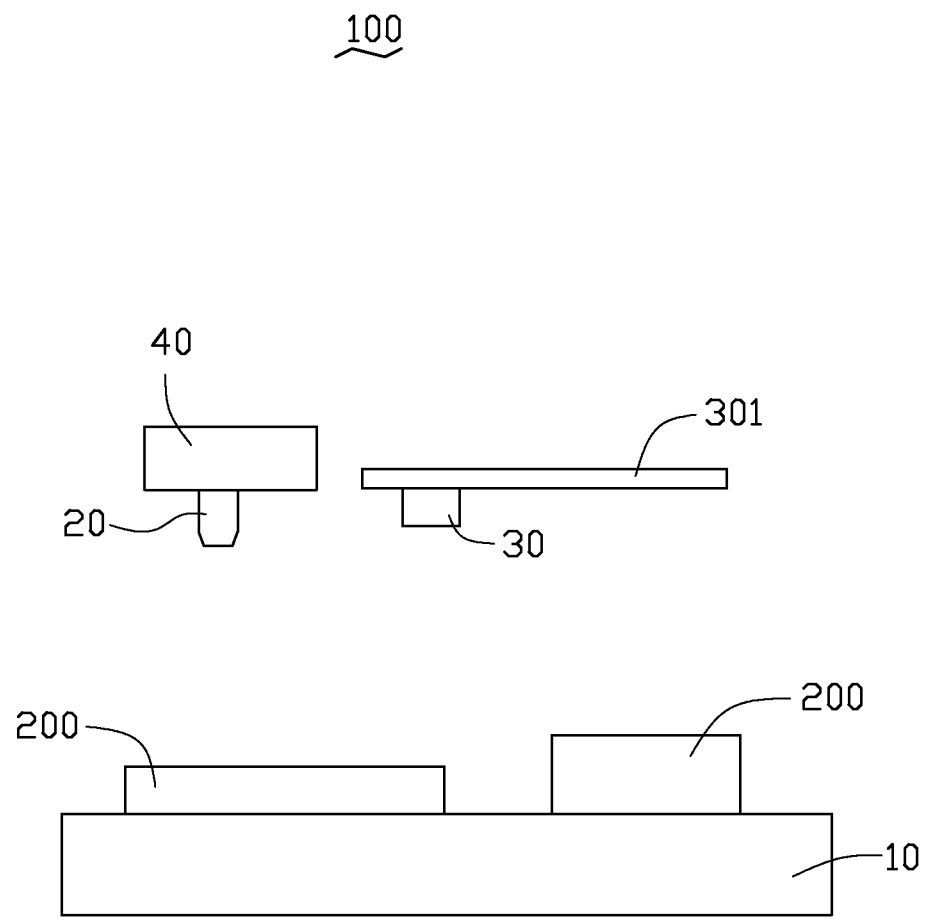
FIG. 1 is a side elevational view of a laser processing system in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 2:
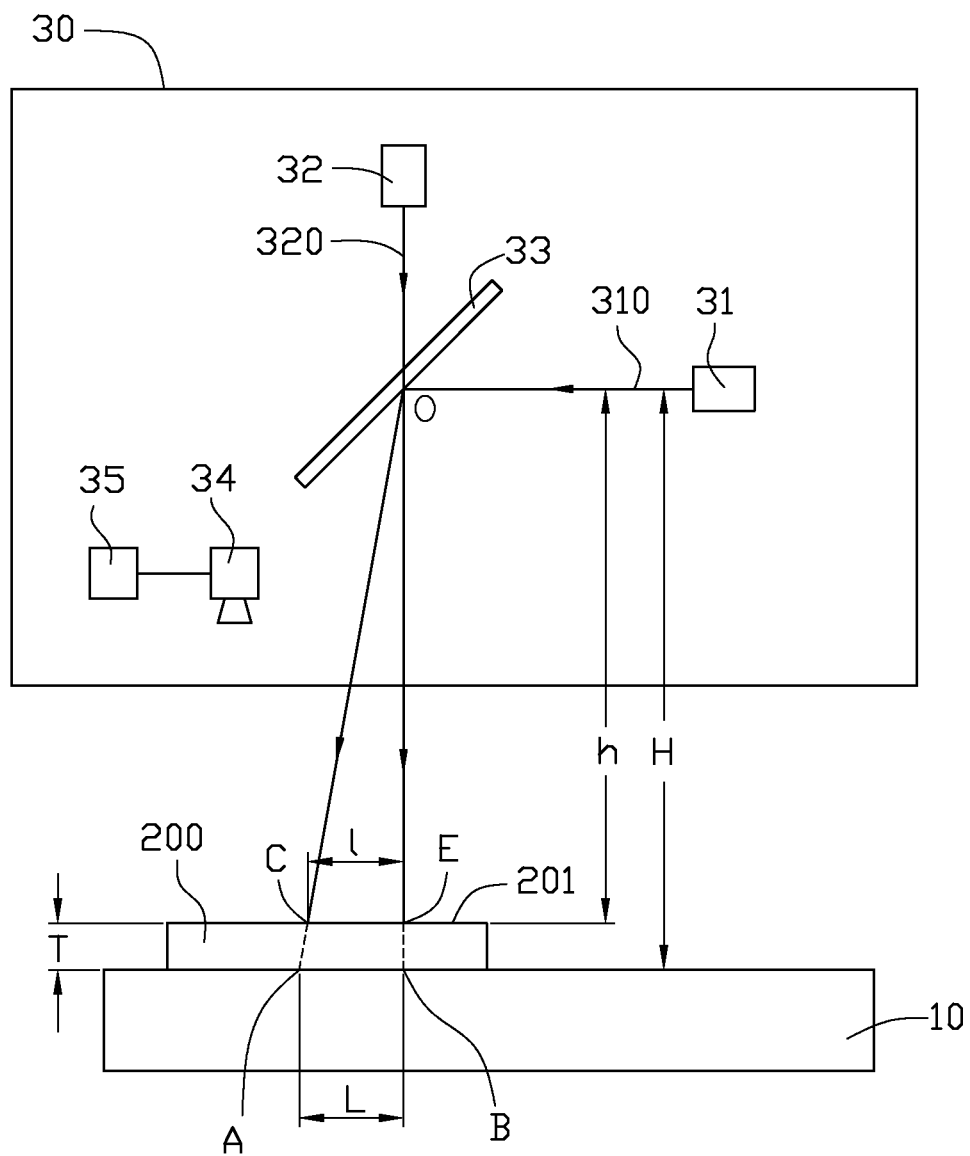
FIG. 2 is a diagrammatic illustration of an inner structure of a distance detection device of the laser processing system of FIG. 1.
Figure 3:
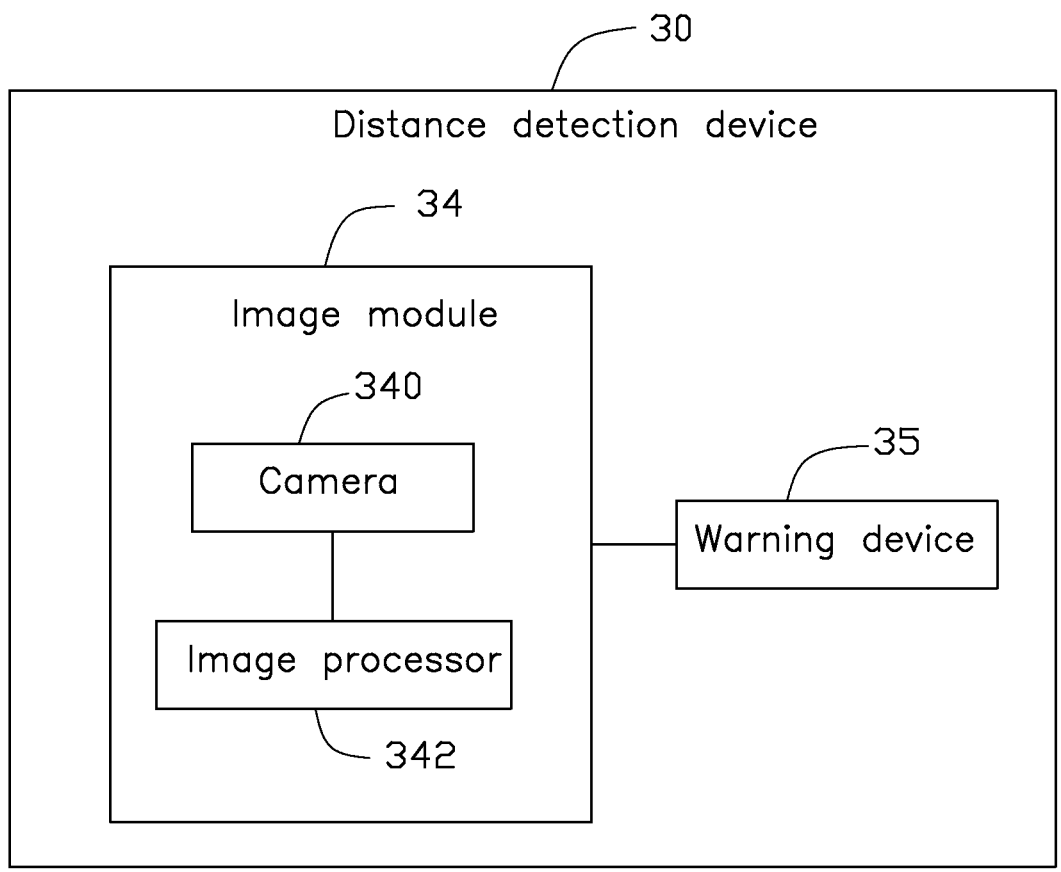
FIG. 3 is a functional block diagram of the distance detection device of FIG. 2.

FIGS. 1-3 illustrate a laser processing system 100 according to an exemplary embodiment. The laser processing system 100 includes a platform 10, a laser processing device 20, a distance detection device 30, a driving device 40. The platform 10 is configured for carrying at least one pre-processed workpiece 200.

The laser processing device 20 is fixed to the driving device 40, and the driving device 40 is configured for driving the laser processing device 20 to move vertically, thus adjusting a distance between the laser processing device 20 and a surface of the pre-processed workpiece 200.

The distance detection device 30 is fixed on a horizontal supporting rod 301 and able to slide along the horizontal rod 301. The distance detection device 30 can be used for detecting different pre-processed workpieces 200 on the platform 10. A distance between the horizontal supporting rod 301 and the platform 10 is fixed. The distance detection device 30 is configured to detect an actual height of the pre-processed workpiece 200, and compare the actual height with a preset height. If the preset height is less than the actual height, the distance detection device 30 emits a warning to remind a worker to re-enter a new preset height.

The distance detection device 30 includes a first laser light source 31, a second laser light source 32, a light splitting element 33, an image module 34, and a warning device 35. A first laser beam 310 is emitted from the first laser light source 31 along a horizontal direction, a second laser beam 320 is emitted from the second laser light source 32 along a vertical direction. A color of the first laser beam 310 is different than a color of the second laser beam 320. In this embodiment, the first laser beam 310 is a yellow light, the second laser beam 320 is a blue light, the light splitting element 33 can reflect the yellow light and allow the blue light to pass therethrough. A distance between the second laser source 32 and the platform 10 is larger than a distance between the first laser source 31 and the platform 10. The light splitting element 33 is located at an intersection "O" of the first laser beam 310 and the second laser beam 320 (see FIG. 2), and inclined relative to the first laser beam 310 and the second laser beam 320. An optical path of the first laser beam 310 after being reflected by the splitting element 33 is different from an optical path of the second laser beam 320 when it passes through the light splitting element 33. The first laser beam 310 is reflected by the splitting element 33 and reaches the platform 10 to form a first light point "A", and the second laser beam 320 penetrates the splitting element 33 and reaches the platform 10 to form a second light point "B".

The image module 34 includes a camera 340 and an image processor 342 electrically connected with the camera 340. The camera 340 is configured for capturing a first image of the first light point A and the second light point B. The image processor 342 is configured for analyzing and determining a first distance "L" between the first light point "A" and the second light point "B" according to the first image.

When a pre-processed workpiece 200 is arranged on the platform 10, the first laser beam 310 is reflected by the splitting element 33 and reaches a top surface 201 of the pre-processed workpiece 200 forming a third light point "C." The second laser beam 320 penetrates the splitting element 33 and reaches a top surface 201 of the pre-processed workpiece 200 forming a fourth light point "E." The camera 340 is also configured for capturing a second image of the third light point "C" and the fourth light point "E", and detemining a second distance between the third light point "C" and the fourth light point "E" from the second image.

Connection lines from the intersection "O", the first light point "A", and the second light point "B" together form a first triangle. Connection lines from the intersection "O", the third light point "C", and the fourth light point "E" together form a second triangle. The first triangle is similar to the second triangle. The third distance "H" between the first laser beam 310 and the platform 10 is measured by a measuring tool such as a microcaliper.

The warning device 35 is electrically connected with the image module 34. The warning device 35 is configured for receiving the results disposed by the image processor 342 and emitting a warning signal if required. In one embodiment, the warning device 35 is a buzzer, and the warning signal is audible. In the illustrated embodiment, the warning device 35 is a light-emitting diode (LED), and the warning signal is visible.

Figure 4:
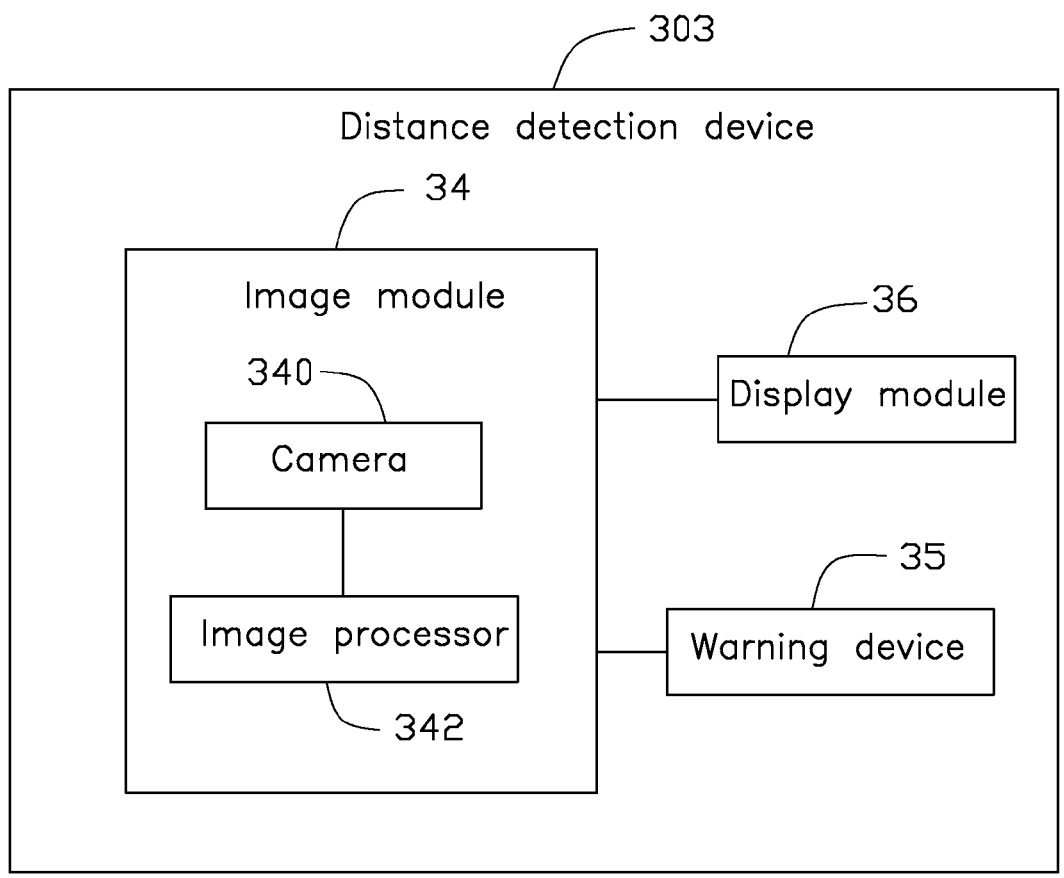
FIG. 4 is a functional block diagram of the distance detection device in accordance with a second embodiment.
Figure 5:
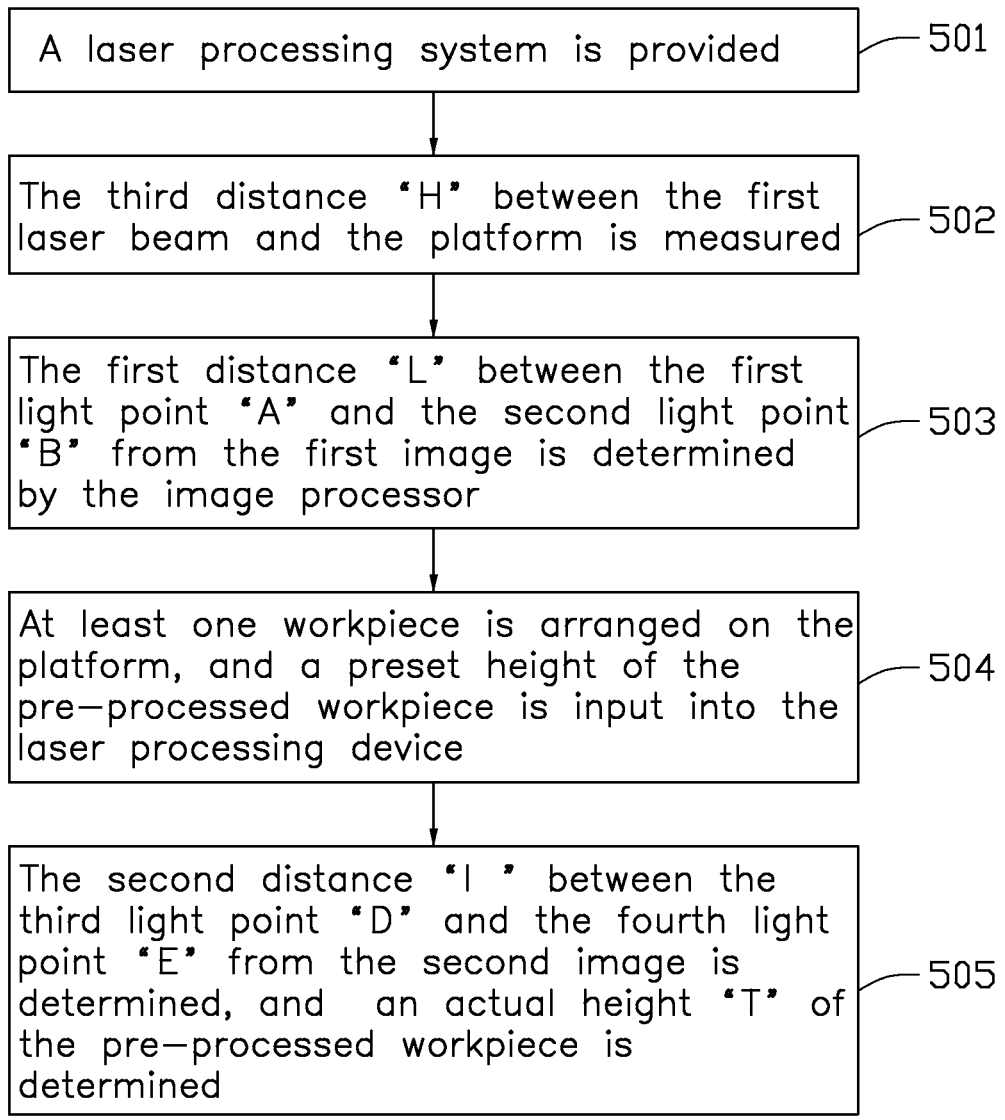
FIG. 5 shows a flowchart of a processing method of a laser processing system in FIG. 1.

FIG. 4 shows a distance detection device 303 according to a second embodiment. The difference between distance detection device 30 and distance detection device 303 in the second embodiment is that the distance detection device 303 further includes a display module 36 electrically connected to the image module 34. The display module 36 is configured for displaying the actual height of the workpiece 200 as determined by the image processor 342.

A method for using the laser processing system 100 is described below. The exemplary method 300 can begin at block 501.

At block 501, a laser processing system 100, as mentioned above, is provided.

At block 502, the third distance "H" between the first laser beam 310 and the platform 10 as shown in FIG. 2 is measured.

At block 503, the first distance "L" between the first light point "A" and the second light point "B" from the first image is determined by the image processor 342.

At block 504, at least one workpiece 200 is arranged on the platform 10. A preset height of the pre-processed workpiece 200 is input into the laser processing device 20. The driving device 40 is able to adjust a pre-processed distance of the laser processing device 40 relative to the pre-processed workpiece 200 to make sure the point of focus of the laser device 40 is coplanar with the top surface 201 to reach an optimal process efficiency.

At block 505, the second distance "l" between the third light point "D" and the fourth light point "E" from the second image is determined, and an actual height "T" of the pre-processed workpiece 200 is determined according to the relationship between the proportion of similar triangles. The first distance, the second distance, and the third distance "H" are determined. The distance "h" between the first laser beam 310 and the top surface 201 of the pre-processed workpiece 20 can be calculated by the equation $$h = \frac{l}{L}H.$$

In the illustrated embodiment, it is the top surface 201 which will be processed. The actual height "T" of the pre-processed workpiece 200 is calculated by the equation T=H−h. Then the image processor 342 compares the preset height with the actual height; if the preset height is less than the actual height, this means that the laser processing device 20 may physically collide with the pre-processed workpiece 200, and the distance detection device 30 emits a warning to remind a worker to re-enter a new actual height. The driving device 40 will adjust the laser processing device 20 according to the new actual height and thereafter the pre-processed workpiece 200 can be processed.

In summary, the height detection device can be used for detecting the actual height before the workpiece is processed with no risk of damage to the laser process device and/or the workpiece caused by an operator input of the wrong height into the laser device, and efficiency of the laser processing system is improved.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A laser processing system comprising:
    a platform configured for carrying at least one pre-processed workpiece;
    a laser processing device and a distance detection device, both the laser processing device and the distance detection device are arranged upon the platform;
    the distance detection device configured for detecting an actual height of the pre-processed workpiece, and comparing a preset height with the actual height, if the preset height is less than the actual height, the distance detection device emitting a warning signal to remind a worker to re-enter a new preset height;
    wherein the distance detection device comprises a first laser light source, a second laser light source, a light splitting element, and an image module; the first laser light source emitting a first laser beam along horizontal direction, the second laser light source emitting a second laser beam along vertical direction, a distance between the second laser source and the platform is larger than a distance between the first laser source and the platform, the light splitting element is located at an intersection of the first laser beam and the second laser beam, and inclined relative to the first laser beam and the second laser beam, the first laser beam is reflected by the splitting element and reaches the platform forming a first light point, the second laser beam penetrate the splitting element and reaches the platform forming a second light point, the image module comprises a camera and an image processor electrically connected with the camera, the camera is configured for capturing a first image of the first light point and the second point, the image processor is configured for accumulating a first distance between the first light point and the second light point according to the first image.

2. The laser processing system of claim 1, comprising a horizontal supporting rod, wherein the distance detection device is fixed on the horizontal supporting rod and able to slide along the horizontal rod, a distance between the horizontal supporting rod and the platform is set to a fixed value.

3. The laser processing system of claim 2, wherein the first laser beam is reflected by the splitting element and reaches a top surface of the pre-processed workpiece forming a third light point, the second laser beam penetrates the splitting element and reaches the top surface of the pre-processed workpiece forming a fourth light point, the camera is configured for capturing a second image of the third light point and the fourth light point, and accumulating a second distance between the third light point and the fourth light point according to the second image.

4. The laser processing system of claim 3, wherein connection lines by the intersection of the first laser beam and the second laser beam, the first light point and the second light point form a first triangle, connection lines by the intersection of the first laser beam and the second laser beam, the third light point and the fourth light point form a second triangle, the first triangle is similar to the second triangle, a third distance between the first laser beam and the platform is measured by a measuring tool.

5. The laser processing system of claim 4, comprising a driving device, wherein the laser processing device is fixed to the driving device, and the driving device is configured for driving the laser processing device move along vertical direction, thus adjusting the distance between the laser processing device and the top surface of the pre-processed workpiece according to the preset height.

6. The laser processing system of claim 1, wherein the distance detection device comprises a warning device, the warning device is connected with the image module, the warning device is configured for emitting the warning signal.

7. The laser processing system of claim 6, wherein the warning device is configured to emit an audible warning signal.

8. The laser processing system of claim 6, wherein the warning device is configured to emit a visual warning signal.

9. The laser processing system of claim 1, wherein the distance detection device further comprises a display module electrically connected to the image module, the display module is configured for displaying the actual height accumulated by the image processor.

10. A laser processing method, comprising:
providing a laser processing system of claim 5;
measuring the third distance between the first laser beam and the platform;
determining the first distance between the first light point and the second light point according to the first image,
arranging at least one workpiece on the platform, entering a preset height of the pre-processed workpiece into the laser processing device;
determining a second distance between the third light point and the fourth light point according to the second image, calculating an actual height of the pre-processed workpiece according to the first distance, the second distance and the third distance, and comparing the preset height with the actual height, if the preset height is less than the actual height, the distance detection device emitting a warning signal to remind a worker to re-enter a new actual height.

* * * * *